United States Patent
Jabbour et al.

(10) Patent No.: US 9,780,355 B2
(45) Date of Patent: Oct. 3, 2017

(54) METHOD FOR PREPARING SELF-SUPPORTING FLEXIBLE ELECTRODES

(71) Applicants: CENTRE NATIONAL DE LA RECHERCHE SCIENTIFIQUE, Paris (FR); INSTITUT POLYTECHNIQUE DE GRENOBLE, Grenoble (FR)

(72) Inventors: Lara Jabbour, Grenoble (FR); Didier Chaussy, Brie et Angonnes (FR); Davide Beneventi, Saint Martin D'Heres (FR); Matteo Destro, Turin (IT); Silvia Bodoardo, Turin (IT); Claudio Gerbaldi, Turin (IT); Nerino Penazzi, Vercelli (IT)

(73) Assignees: INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 777 days.

(21) Appl. No.: 14/347,871

(22) PCT Filed: Oct. 4, 2012

(86) PCT No.: PCT/FR2012/052256
§ 371 (c)(1),
(2) Date: Mar. 27, 2014

(87) PCT Pub. No.: WO2013/050713
PCT Pub. Date: Apr. 11, 2013

(65) Prior Publication Data
US 2014/0255782 A1 Sep. 11, 2014

(30) Foreign Application Priority Data
Oct. 6, 2011 (FR) .................................. 11 59046

(51) Int. Cl.
*H01M 4/13* (2010.01)
*H01M 4/04* (2006.01)
(Continued)

(52) U.S. Cl.
CPC ....... *H01M 4/0416* (2013.01); *H01M 4/0433* (2013.01); *H01M 4/131* (2013.01);
(Continued)

(58) Field of Classification Search
CPC .......... H01M 4/38; H01M 4/62; H01M 4/133; H01M 10/02; H01M 10/04
(Continued)

(56) References Cited

U.S. PATENT DOCUMENTS

2011/0183180 A1  7/2011  Yu et al.

FOREIGN PATENT DOCUMENTS

DE  10163389  7/2003
EP  0028879  5/1981

OTHER PUBLICATIONS

Search Report dated 2012.
(Continued)

*Primary Examiner* — Khanh Tuan Nguyen
(74) *Attorney, Agent, or Firm* — IPSILON USA, LLP (57) ABSTRACT

A method for preparing self-supporting flexible electrodes is provided using refined cellulose fibers as binder. The negative or positive self-supporting flexible electrode is obtained by such method. A Li-ion battery is also provided in which at least one electrode is a self-supporting flexible electrode.

16 Claims, 4 Drawing Sheets (51) Int. Cl.
   *H01M 4/131* (2010.01)
   *H01M 4/139* (2010.01)
   *H01M 4/1391* (2010.01)
   *H01M 4/62* (2006.01)
   *H01M 10/0525* (2010.01)
   *H01M 4/485* (2010.01)

(52) U.S. Cl.
   CPC ......... *H01M 4/139* (2013.01); *H01M 4/1391* (2013.01); *H01M 4/485* (2013.01); *H01M 4/621* (2013.01); *H01M 10/0525* (2013.01); *H01M 2220/30* (2013.01); *Y02T 10/7011* (2013.01)

(58) Field of Classification Search
   USPC ...... 429/124, 127, 128, 211, 231.8; 162/100
   See application file for complete search history.

(56) References Cited

OTHER PUBLICATIONS

"Nanosized Si/cellulose fiber/carbon composites as high capacity anodes for lithium-ion batteries: A galvanostatic and dilatometric study" Gomez et al. Dated Nov. 1, 2009.

METHOD FOR PREPARING SELF-SUPPORTING FLEXIBLE ELECTRODES

RELATED APPLICATIONS

This application is a National Phase Application of PCT/FR2012/052256, filed on Oct. 4, 2012, which in turn claims the benefit of priority from French Patent Application No. 11 59046 filed on Oct. 6, 2011, the entirety of which are incorporated herein by reference.

BACKGROUND

Field of the Invention

The present invention relates to the field of flexible lithium-ion (Li-ion) batteries. In particular, the present invention relates to a method for preparing a self-supporting flexible electrode composition that requires neither the use of a synthetic polymer binder nor the use of organic solvents. The invention relates also to a negative or positive flexible composite electrode obtained by the implementation of said method, as well as a lithium-ion battery comprising at least one such flexible electrode.

Description of Related Art

Flexible Li-ion batteries can be used, like the conventional Li-ion batteries, in numerous devices which comprise portable appliances, such as, in particular, mobile phones, computers and light tools, or heavier appliances such as two-wheeled transport means (bicycles, motorized bicycles) or four-wheeled transport means (electric or hybrid motor vehicles). Generally, the flexible batteries can be used in all the applications in which it is desirable for the battery to be able to be deformed or to be folded in order, for example, to fill the empty spaces in hybrid or electric cars or to supply pliable electronic devices other than in all the conventional applications of rigid Li-ion batteries.

A conventional lithium-ion (Li-ion) battery comprises at least one negative electrode (anode) and at least one positive electrode (cathode) between which is placed a solid electrolyte or a separator impregnated with a liquid electrolyte. The liquid electrolyte consists, for example, of a lithium salt in solution in a solvent chosen to optimize the transport and dissociation of the ions. In particular, in a lithium-ion battery, each of the electrodes generally comprises a current collector (metal substrate) on which is deposited a composite material which comprises a material that is active with respect to the lithium, a polymer which acts as binder (for example a copolymer of vinylidene fluoride (PVdF)), an agent conferring electronic conductivity (such as, for example, carbon black) and a solvent.

During the operation of the battery, lithium ions pass from one of the electrodes to the other through the electrolyte. During the discharging of the battery, a quantity of lithium reacts with the active positive electrode material from the electrolyte, and an equivalent quantity is introduced into the electrolyte from the active material of the negative electrode, the lithium concentration thus remaining constant in the electrolyte. The insertion of the lithium into the positive electrode is compensated by the input of electrons from the negative electrode via an external circuit. During charging, the reverse phenomena take place.

The operation of the flexible Li-ion batteries is the same as that mentioned above for the conventional Li-ion batteries. However, in order to obtain a flexible or pliable battery, it is important to also develop electrodes that not only exhibit a strong conductivity, but also in which the layer of active material exhibits a strong adhesion to the substrate, which makes it possible to avoid the appearance of cracks, even the lifting of the active material after the flexing of the battery or, preferably, to develop self-supporting electrodes which do not require the use of a metal substrate.

Various methods for manufacturing flexible electrodes have been proposed in the literature. In particular, anodes exhibiting an enhances flexibility have been obtained by the filtration of suspensions of carbon nanotubes [S. Y. S. Chew, et al., Carbon, 2009, 47, 2976-2983], by pulsed laser ablation of silicon on carbon nanotube films [S. Chou, et al., The Journal of Physical Chemistry, 2010, C 114, 15862-15867] or even by laminating flakes of graphite in order to obtain graphite sheets used as anode [M. Yacizi, et al., Journal of Power Sources, 2005, 141, 171-176]. However, the methods developed above present drawbacks; they require the use of expensive raw materials, they take a long time to implement and consume a lot of energy or, in a few cases, the prepared electrodes exhibit weak electrochemical properties compared to the conventional electrodes.

The use on nano-Si/cellulose composite anodes comprising cellulose fibres as inert filler and demonstrating a good electrochemical stability has also already been proposed [J. L. G. Camer, et al., Electrochimica Acta, 2009, 54, 6713-6717]. However, the composite anodes of this publication were prepared using an organic solvent. Furthermore, the mechanical characteristics have not been determined and the application of these electrodes in a flexible Li-ion battery does not appear possible to envisage.

Furthermore, a synthetic polymer binder and an organic solvent are generally used to manufacture the electrodes. However, these compounds are not very environmentally friendly. Now, the current trend is, on the contrary, to find production techniques which have the weakest possible impact on the environmental front and to obtain devices/batteries which are easy to recycle.

To remedy these drawbacks, it has recently been demonstrated that microfibrillated cellulose dispersed in water can be used as binder for manufacturing graphite-based electrodes by boiling a suspension of graphite and of microfibrillated cellulose into a mould and eliminating the water by evaporation. This method thus avoids the use of synthetic polymers, of organic solvents and of metal substrates. However, the low speed of evaporation of the water and the high energy consumption required to produce microfibrillated cellulose represent a brake for the manufacture of these electrodes on an industrial scale [L. Jabbour, et al., J. Mater. Chem., 2010, 20, 7344-7347].

It has also been proposed to prepare a microfibrillated cellulose (produced by a *Clodophora* algae)/polypyrrole (PPy) composite material for the manufacturing of flexible batteries entirely based on organic materials. However, the low energy by weight (25 Wh/kg) and energy by volume (40 Wh/L) densities of the batteries thus obtained (NaCl-PPy) do not allow a direct comparison with the lithium-ion batteries, whether in terms of electrochemical performance or of the applications targeted.

OBJECTS AND SUMMARY

Consequently, there is in the prior art no method for preparing flexible electrodes for Li-ion batteries which is simple, inexpensive and environmentally-friendly while allowing for the production of Li-ion batteries exhibiting good electrochemical performance levels.

The aim of the present invention is to provide:
- a composition for the creation of a flexible electrode, negative or positive, intended to be used in a lithium-ion battery,
- a method for creating such a flexible electrode,
- a Li-ion battery comprising at least one such flexible electrode.

In particular, the aim of the present invention is to provide a method for preparing flexible electrodes which wholly or partly avoids the abovementioned drawbacks.

A first object of the present invention is therefore a method for preparing a self-supporting flexible electrode comprising at least one active electrode material, and at least one binder, said method comprising at least the following steps:

i) a step of preparation of an aqueous paste by dispersion of a mixture of solid particles in an aqueous phase, said mixture of solid particles comprising:
- at least one active electrode material, in a quantity varying from 50 to 98% by weight relative to the total weight of the mixture of solid particles;
- at least one binder comprising refined cellulose fibres, in a quantity varying from 2 to 50% by weight relative to the total weight of the mixture of solid particles;

said mixture of solid particles representing at least 0.02% by weight of the total weight of the aqueous paste;

ii) a step of filtration of the aqueous paste obtained above in the step i) on a filtration cloth;

iii) optionally, a step of pressing, in the wet state, of the aqueous paste followed by its transfer onto a drying felt;

iv) a drying step to obtain a sheet of dry flexible electrode supported by the filtration cloth or by the drying kit when the step iii) has been carried out;

v) a step of separation between the sheet of electrode and the filtration cloth or the drying felt when the step iii) has been carried out, to obtain the self-supporting flexible electrode.

The Applicant company has thus discovered, and surprisingly, a simple, inexpensive and environmentally friendly method that makes it possible to prepare both thin and flexible electrodes and flexible Li-ion batteries. For this, the binder of the electrode is made of refined cellulose fibres. These fibres make it possible in fact to uniformly imprison the active electrode material while conferring on it a better bending resistance. Furthermore, the use of such fibres leads to an electrode with excellent mechanical properties while retaining good electrochemical performance levels. The filtration method is rapid, based on a liquid phase such as water, and free of synthetic polymers or organic solvents. This method can easily be adapted to an industrial scale. Furthermore, as will be demonstrated in the examples illustrating the present application, the half-anode cells prepared in accordance with the method of the invention show very good specific charge/discharge capacities and good cyclic performance levels compared to the results cited in the literature or obtained with a reference anode baaed on symbolic graphite powder (GP) and a polymer binder such as polyvinylidene fluoride (PVdF).

According to the invention, "refined cellulose fibres" should be understood to be cellulose fibres that have a Schopper-Riegler degree (° SR) varying from 30 to 95 SR approximately. This physical characteristic comes from the paper industry and is used to quantify the degree of refining of these cellulose fibres. The refining is therefore measured in degrees Schopper-Riegler (° SR), corresponding to a draining rating (the more a paste retains water, the more refined it is). The Schopper-Riegler degree of refining is determined by a measure of the drainability of the paste according to the method described in the standard ISO 5267. The Schopper-Riegler test is designed to give the measure of the velocity at which the water can be extracted from a diluted paste suspension. It has been demonstrated that the drainability is a function of the surface condition and of the swelling of the fibres, and that it constitutes a representative index of the intensity of the mechanical treatment undergone by the paste.

According to a preferred embodiment of the invention, the refined cellulose fibres (FBr) can be obtained by a refining method comprising the following steps:

a) a step of dispersion, in an aqueous medium, of previously dried cellulose fibres, to obtain a cellulose fibre paste in which the cellulose fibre content varies from 1 to 15% by weight relative to the total weight of said cellulose fibre paste;

b) a step of shearing of said cellulose fibre paste, so as to obtain refined cellulose fibres, that is to say cellulose fibres exhibiting a Schopper-Riegler degree varying from 30 to 95° SR approximately.

As in the field of the paper industry, the refining step according to the present invention is a mechanical treatment of the cellulose fibres in order to obtain their hydration (step a)), their fibrillation and their shortening as well as the creation of thin elements (step b)).

The step of placing in suspension (step a)) generally lasts between 10 and 20 minutes and is performed using so-called low-concentration (turbine rotor) or high-concentration (helicoidal rotor) dispersers. On completion of the step a), the raw material is in the form of a paste of cellulose fibres dispersed in the water. The fibre concentration in said paste is of the order of 1 to 15% by weight (depending on the type of pulper used to create the suspension). Before the shearing step b) is carried out, the concentration of the cellulose fibre paste is optionally adjusted so as not to exceed 5% by weight.

The shearing step b) can notably be carried out in the air gap of a rotating machine such as, for example, a conventional cone, disc or drum refiner such as a refiner of Valley type. The air gap is the space, of a few hundred microns, that exists between the facing blade surfaces, arranged on discs (or cylinders or cones) in relative motion. For a few milliseconds, the fibres undergo both a compression and a shearing therein.

Thus, during this shearing step, the morphology of the cellulose fibres changes from a compact cylindrical form (initial form) to a disorderly hair-form structure. The shearing (refining) step in fact involves a release of fibrilles through partial rupture of the walls. Furthermore, this step makes it possible to improve the degree of linkage of the cellulose fibres and thus the mechanical properties of the electrodes incorporating them.

According to a preferred embodiment of the invention, the shearing step b) is conducted until the refined cellulose fibres (FBr) exhibit a degree of at least 30° SR, more preferentially at least 60° SR, even more preferentially at least 80° SR.

The quantity of cellulose fibres used in this step i) of the method according to the invention preferably varies from 2 to 50% by weight approximately relative to the total weight of the mixture of solid particles.

The aqueous phase preferably consists of water.

Preferably, an anti-flocculation agent for the fibres is incorporated in the aqueous suspension of the step i). This anti-flocculation agent, in addition to the fact of avoiding the flocculation of the cellulose fibres during the filtration, makes it possible to improve the homogeneity and the mechanical strength of the dry electrodes as well as their electronic conductivity. An anti-flocculation agent that is suitable for the present invention can be carboxymethylcellulose (CMC), starch or one of their derivatives or mixtures. When it is used, the anti-flocculation agent for the fibres preferable represents from 0.01 to 10% by weight approximately, and even more preferentially from 0.05 to 1% by weight approximately relative to the total weight of the aqueous paste of the step i).

The aqueous suspension of the step i) can also contain at least one agent generating an electronic conductivity. The agent generating an electronic conductivity that is suitable for the present invention is preferable chosen from carbon black, carbon SP, acetylene black, carbon fibres and nanofibres, carbon nanotubes, metal particles and fibres and one of their mixtures. When it is used, the agent generating an electronic conductivity generally represents from 0.1 to 50% by weight, preferably from 5 to 30% approximately by weight, relative to the total weight of the dry material.

The active electrode material preferable takes the form of particles with an average dimension less than 200 μm, preferably with dimensions less than 100 μm and even more preferably less than 50 μm.

According to a particular and preferred embodiment of the method according to the invention, the concentration by weight of the mixture of solid particles in the aqueous suspension on completion of the step i) varies from 0.02 to 5% approximately, preferably from 0.05 to 2 and even more preferentially from 0.1 to 1.5%.

For the step ii), it is preferable to use a filtration threshold of the order of 1 to 100 μm approximately, and even more preferentially of the order of 10 to 50 μm. The filtration can, for example, be carried out using paper filters, polymer membranes or cloths (polymer or metallic) exhibiting the appropriate filtration threshold. The duration and the effectiveness of the filtration method can vary according to the composition of the aqueous suspension and the filtration threshold.

The stags of filtration, of pressing in the wet state and of drying are performed in sequence. The drying step is generally carried out at a temperature of 50 to 150° C.; preferably 80 to 120° C. and even more preferentially 90 to 110° C. preferably in a vacuum to favour the elimination of water.

A self supporting flexible electrode according to the invention is obtained by the method as described above and constitutes another object of the present invention. It is characterized in that it comprises at least one active electrode material, possibly at least one agent generating an electrical conductivity, possibly an anti-flocculation agent for the fibres and at least one binder comprising refined cellulose fibres (FBr) imprisoning said active electrode material.

A flexible positive electrode according to the invention is obtained by the abovementioned method. The active material that may be suitable for said positive electrode can be chosen from the particles of cathodic material compatible with an aqueous medium and with a diameter <200 μm, preferably <100 μm and even more preferentially <50 μm. Examples of cathodic materials that can be used in the present invention are: $Li_xMn_yO_4$ ($0<x<2$, $0<y<2$ and $x+y=3$), $LiCoO_2$, $LiMPO_4$, (M=Fe, Mn, Co, Ni), $LiAl_x Co_yNi_zO_2$ ($0<x<1$, $0<y<1$, $0<z<1$ and $x+y+z=1$), $LiNi_{(3-y)}Co_yO_2$ ($0 \le y \le 1$), etc.

A flexible negative electrode according to the invention is obtained by the abovementioned method. The active material that may be suitable for said negative electrode can be chosen front the particles of anodic material compatible with water and with a diameter <200 μm, preferably 100 μm and even more preferentially <50 μm. Examples of anodic materials are: graphite, hard carbon, soft carbon, the metal alloys of the type $Li_yM$ ($1<y<5$ and M=Mn, Sn, Pb, Si, In, Ti) etc.

According to a preferred embodiment of the invention, the self-supporting flexible electrode has a thickness varying from 50 to 300 μm and even more preferentially from 80 to 150 μm.

A flexible lithium-ion battery comprising at least one self-supporting flexible electrode according to the present invention, constitutes another object of the present invention.

A flexible lithium-ion battery according to the present invention comprises at least one negative electrode and at least positive electrode between which is placed a solid electrolyte (polymer or vitreous) or a separator impregnated with a liquid electrolyte. It is characterized in that the positive electrode and/or negative electrode is a self-supporting flexible electrode according to the invention.

The electrolyte that is suitable for the present invention can consist of a lithium salt in solution in a solvent chosen to optimize the transport and dissociation of the ions. The lithium salt can be chosen for example from $LiPF_6$, $LiAsF_6$, $LiClO_4$, $LiBF_4$, $LiC_4BO_8$, $Li(C_2F_5SO_2)_2N$, $Li[(C_2F_5)_3PF_3]$, $LiCF_3SO_3$, $LiCH_3SO_3$, $LiN(SO_2CF_3)_2$, and $LiN(SO_2F)_2$.

The solvent can be a liquid solvent comprising one or more aprotic polar compounds chosen from the linear or cyclic carbonates, the linear or cyclic ethers, the linear or cyclic esters, the linear or cyclic sulphones, the sulphamides and the nitriles. The solvent preferably consists of at least two carbonates chosen from ethylene carbonate, propylene carbonate, dimethyl carbonate, diethyl carbonate and methyl and ethyl carbonate.

The separator can be simple paper with a controlled porosity, soaked in liquid electrolyte as described above.

The solid electrolyte can also be chosen from a thermo/photo-setting gel polymer, for example methacrylic based.

According to a preferred embodiment of the invention, the flexible battery is characterized in that each of the electrodes is a self-supporting flexible electrode according to the invention, said electrodes being separated than one another by a sheet of paper impregnated with liquid electrolyte. Thus, the flexible battery according to the invention forms an "all paper" battery and will itself be recyclable and environmentally friendly.

DETAILED DESCRIPTION

The present invention is illustrated by the following examples, to which it is not however limited.

The raw materials used in the examples are listed below:
  Synthetic graphite powder (GP) having an average particle dimension less than 20 µm;
  Carboxymethylcellulose (CMC) of mean molecular mass by weight Mw of 90 000 g·$mol^{-1}$;
  N-methyl-2-pyrrolidinone (NMP) and lithium hexafluorophosphate ($LiPF_6$);
  Polyvinylidene fluoride (PVdF);
  Ethylene carbonate (EC) and diethyl carbonate (DEC), battery grade;
  Bleached leafy wood cellulose fibres (FB);
Except for the cellulose fibres, all the materials were used as received.
  Lithium iron phosphate ($LiFePO_4$),
  Carbon black (CB),
  Hydrated aluminium sulphate: $Al_2(SO_4)_3 \cdot 13.4$-$14.5H_2$)

Example 1

Figure 1:
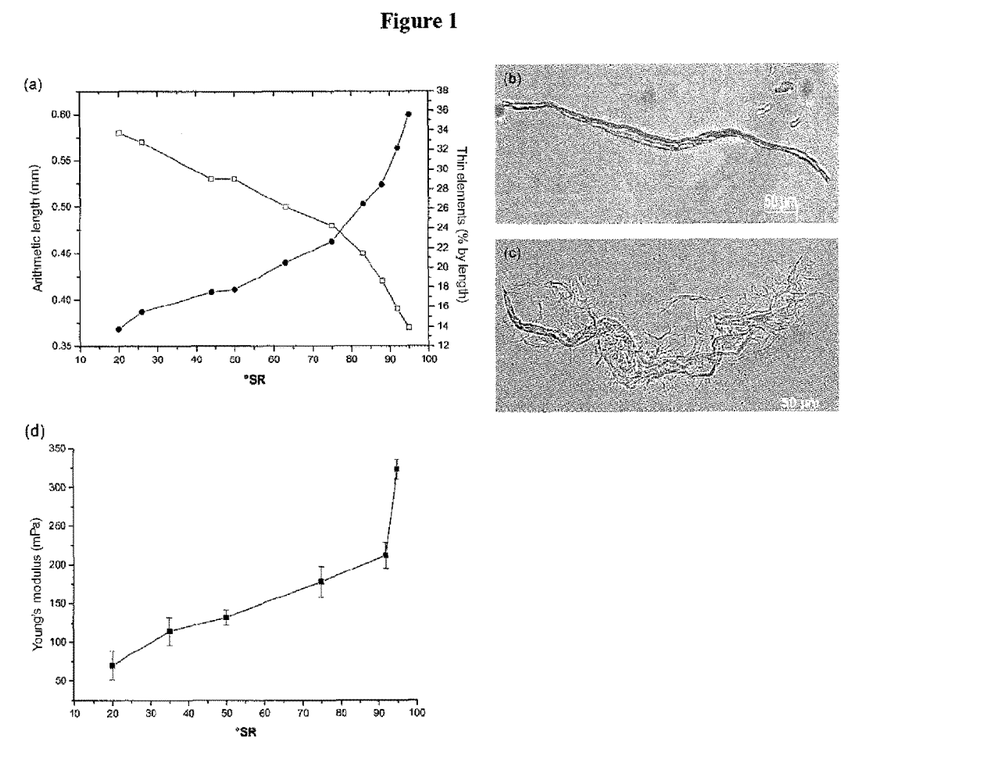
FIG. 1a is a graph representing the average length of the cellulose fibres and the proportion of thin particles (% by length) as a function of the increase in degree of refining ° SR from example 1, in accordance with one embodiment.
FIGS. 1b and 1c are images Observed in the optical microscope of a non-refined cellulose fibre and of a cellulose fibre exhibiting a degree of refining of 95° SR from example 1, in accordance with one embodiment.
FIG. 1d is a graph of the Young's modulus for electrodes prepared from example 1, in accordance with one embodiment.

Preparation of the Refined Cellulose Fibres and Characterizations (FIG. 1)

440 g of dried cellulose fibres (FB) were hydrated in 22 L of water for 24 h, then transformed into paste for 20 minutes in a Lhomargy® disperser, so as to obtain a cellulose fibre suspension. This step produces an outer fibrillation of the fibres which leads to an improvement in the fibre linkage characteristics. The aqueous suspension was then sheared (refined) in a refiner of Valley type according to the standard ISO 5264.

The degree of refining (refining or draining index) was evaluated by means of drainage measurements in accordance with the standard ISO 5267 and is expressed in degrees Shopper-Riegler (° SR). The effects of the refining on the morphology of the fibres was observed using an optical microscope (OM) (Axio Imager M1m Zeiss) and an analyser of the morphology of the fibres. Morfi (TecPap), which was also used to quantify the fraction of thin particles present in the suspension of fibres induced by the refining step. The fibres exhibiting a degree of refining between 20 (non-refined fibres) and 95° SR were used for the preparation of the electrodes which will be used for the characterization tests.

FIG. 1 shows the effect of the refining step on the cellulose fibres. In particular, FIG. 1a is a graph representing the average length of the cellulose fibres and the proportion of thin particles (% by length) as a function of the increase in degree of refining ° SR. The curve with the solid circles corresponds to the trend of the percentage by length of the thin elements and the curve with the empty squares corresponds to the trend of the arithmetical length of the fibres. This FIG. 1a thus shows that, during the refining treatment, namely during the increasing of the degree ° SR, the proportion of the thin particles increases gradually whereas the average length of the fibres decreases. This is in agreement with the characteristic cutting of the long fibers which occurs during the intensive refining for the conventional production of paper. FIGS. 1b and 1c are respectively images observed in the optical microscope of a non-refined cellulose fibre and of a cellulose fibre exhibiting a degree of refining of 95° SR. These figures show that the refining step induces a radical change in the morphology of the fibre. In fact, the compact cylindrical form of the non-refined fibres of FIG. 1b is transformed into a structure in disorderly hair form (FIG. 1c), thus indicating that the fibre cut (during refining) is accompanied by an external micro-fibrillation, namely a release of fibrils by partial rupture of the walls subjected during the refining step. Finally, FIG. 1d refers to electrodes prepared with 25% by weight of cellulose fibres refined to different degrees of refining ° SR and 75% by weight of graphite and gives the results of the measurement of the Young's modulus for each of the duly prepared electrodes. In this figure, the trend of the Young's modulus (modulus of elasticity) of the electrode (MPa) is expressed as a deletion of the degree of refining of the cellulose fibres (° SR). This FIG. 1d thus shows that the electrodes prepared with highly refined cellulose fibres are more uniform and exhibit a better bending resistance than those prepared with cellulose fibres that are little refined. In practice, the refining of the cellulose fibres makes it possible to obtain flexible electrodes but without them breaking or disintegrating.

Example 2

Preparation of a Number of Negative Electrodes (Anodes) and Characterizations

The refined cellulose fibres (FBr) obtained in the Example 1 with a Schopper-Riegler degree of 95° SR and graphite particles (GP) were dispersed in the water by mechanical stirring in order to obtain a thick paste comprising 2% by weight of a mixture of solid particles comprising, depending on the anode preparations, 10%, 15%, 20% or 30% by weight of fibres (FBr) relative to the total weight of the mixture of solid particles.

Before filtering this think aqueous solution, 1% by weight of CMC, relative to the weight of the dried fibres, was added thereto in order to limit the flocculation of the fibres during the filtration and enhance the homogeneity of the anode.

Anodes were also prepared without using CMC.

Following this first step, a mixture 1 (FIG. 2*a*) comprising 2% by weight of solid particles comprising the FBr/Gp elements and, optionally, CMC, was obtained.

Figure 2:
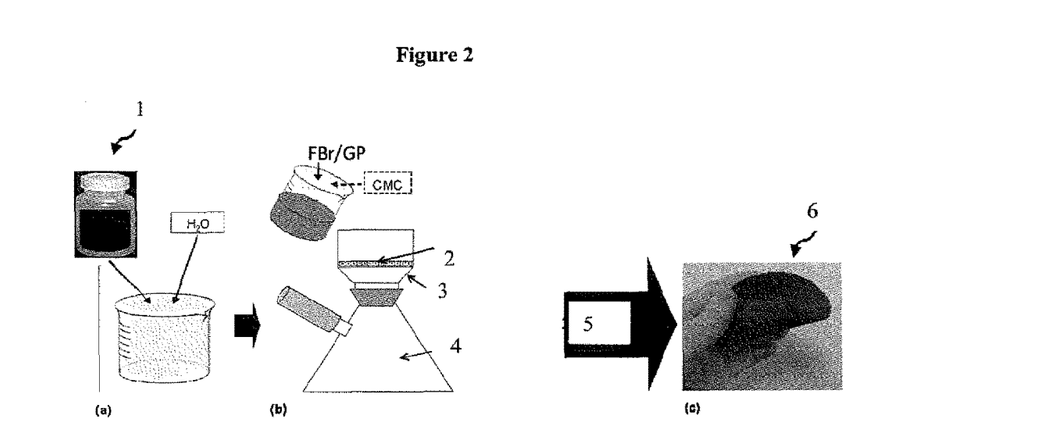
FIGS. 2a-2c shows a series of preparation steps from example 2, in accordance with one embodiment.

Then, as schematically represented in FIG. 2, 19 g of the mixture of 2% by weight of FBr/GP (also possibly comprising, depending on the preparations, CMC) were diluted in 400 ml of water and filtered in a vacuum using a funnel 3, Büchner flask 4 and a filter paper 2 of 90 mm diameter with a filtration threshold of 8 to 12 µm.

The anode preparations filtered in a vacuum located on the filter paper were then pressed and dried in a vacuum for 10 minutes at 90° C. (step referenced 5 in FIG. 2).

Thus, for each preparation, a self-supporting sheet 6 of FBr/GP and possibly comprising CMC, was obtained. This was then detached from the filter paper and stored in controlled conditions of temperature and humidity (23° C., 50% relative humidity).

Figure 3:
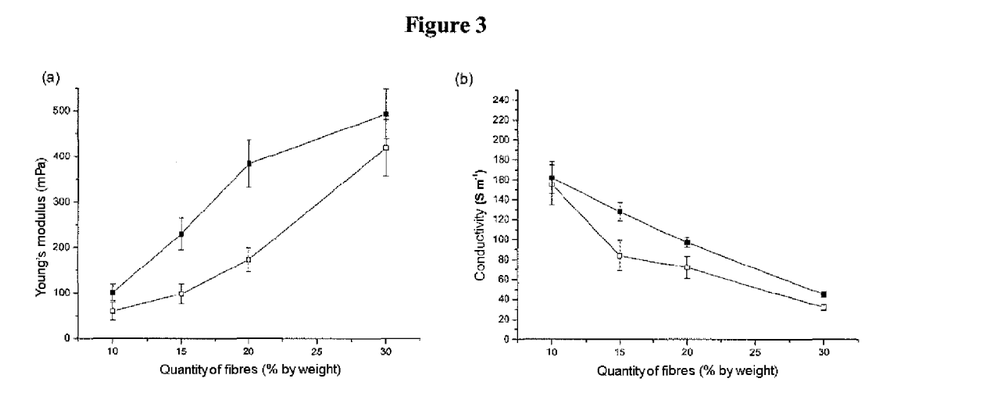
FIG. 3a is a graph of a tensile strength test from example 2, in accordance with one embodiment.
FIG. 3b is a graph of an electrical conductivity from example 2, in accordance with one embodiment.

Measurements of tensile strength (performed using an instrument RSA3, TA Instruments, USA) and of electrical conductivity (four point test, Jandet Universal Probe) were then carried out on the duly prepared electrodes. These measurements are given in the attached FIG. 3. FIG. 3*a* shows the results of the tensile strength test. In this figure, the Young's modulus (in MPa) is a function of the refined fibre content (% by weight). The curve with the solid squares corresponds to the electrodes prepared using an FBr/GP/CMC mixture, whereas the curve with the empty squares corresponds to the electrodes prepared using an Fbr/GP mixture. FIG. 3*b* shows the results of the electrical conductivity test. In this figure, the conductivity ($Sm^{-1}$) is a function of the refined fibre content (% by weight). The curve with the solid squares corresponds at the electrodes prepared using an FBr/GP/CMC mixture, where as the curve with the empty squares corresponds to the electrodes prepared using an FBr/GP mixture.

The measurements of tensile strength and of electrical conductivity revealed the effect of the composition of the electrode on its mechanical properties, notably the Young's modulus which increases with the fraction by weight in fibres, and the electrical conductivity, which, conversely, decreases. The addition of CMC induces an improvement in both the Young's modulus and the electrical conductivity.

Electrochemical tests, performed on a half-battery using a sheet of lithium as back-electrode, a solution of lithium phosphate hexafluoride (1 mol/l) in EC:DEC (1:1) as electrolyte and an anode made up of fibres refined to 95° SR (10% by weight) and GP (90% by weight), with or without CMC, were also produced. By way of comparison, specific capacity measurements were also carried out on a half-battery according to a similar setup in which the anode according to the invention was replaced by an anode prepared by replacing the refined cellulose fibres with a standard binder, PVdF. The GP/PVdf anode was prepared by the deposition of a mixture baaed on NMP containing 10% by weight of PVdF and 90% by weight of GP (relative to the total dry weight) on a sheet of copper and then evaporation of the NMP solvent.

Figure 4:
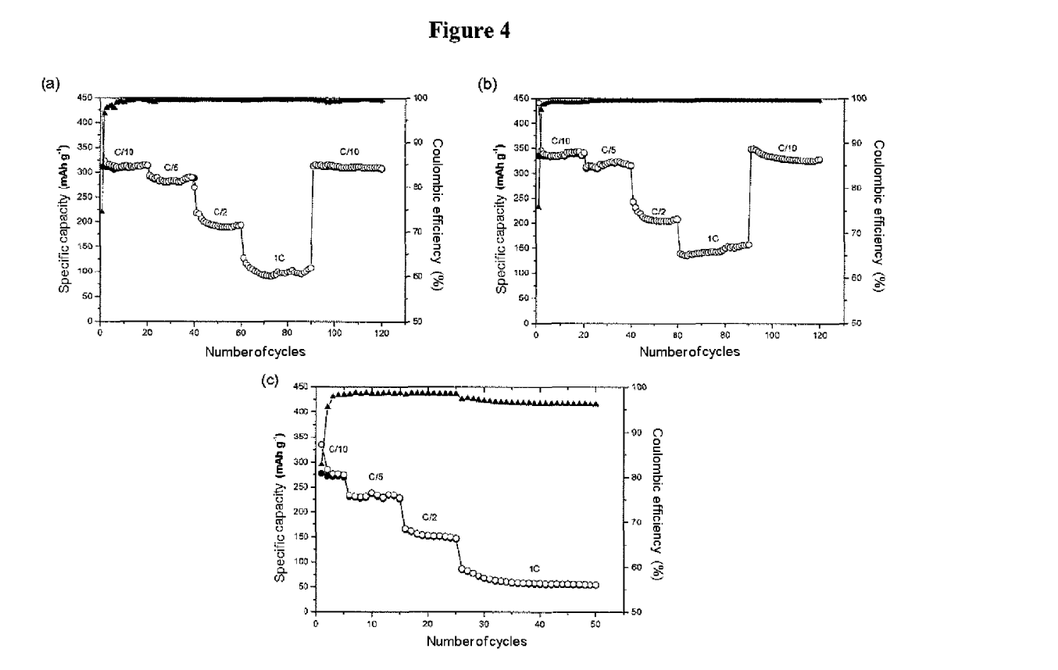
FIG. 4a is a graph of specific capacities from example 2, in accordance with one embodiment.
FIG. 4b is another graph of specific capacities for the anodes without CMC from example 2, in accordance with one embodiment.
FIG. 4c is another graph of specific capacities for the anodes with CMC that are comparable to that of the anodes using a standard binder (PVdF) from example 2, in accordance with one embodiment.

The corresponding specific capacity measurements are given in the attached FIG. 4 in which the specific capacity (in $mAhg^{-1}$) and the coulombic efficiency (in %) are a function of the manner of cycles. FIG. 4*a* corresponds in the measurements carried out on the half-battery comprising an FBr/GP anode without CMC, FIG. 4*b* to the measurements performed on the half-battery comprising an FBr/GP anode with CMC and FIG. 4*c* to the measurements performed on the half-battery comprising a GP/PVdF anode that does not conform to the invention. In these figures, the curves with the solid circles correspond to the values measured when charging, the curves with the empty circles in the values measured when discharging and the curves with the solid triangles to the coulombic efficiency values.

These results show that the FBr/GP anodes reach specific capacities (FIG. 4*a*) for the anodes without CMC and (FIG. 4*b*) for the anodes with CMC that are comparable to that of the anodes using a standard binder (PVdf), (FIG. 4*c*) i.e. approximately 300-350 mAh/g.

Example 3

Preparation of Positive Electrodes (Cathodes) and Characterizations

To improve the affinity between carbon black (CB) and the refined cellulose fibres (FBr, 95° SR), suspensions of CB and FBr ware previously treated:

The CB was treated with CMC by adding between 0 and 2% by weight of CMC to a 2% by weight CB suspension. The concentrations are given relative to the total weight of the suspension.

The FBrs were treated with hydrated aluminium sulphate by adding between 0 and 1% by weight of hydrated aluminium sulphate to an FBr suspension with a concentration of 2% by weight. The concentrations are given relative to the total weight of the suspension.

Figure 5:
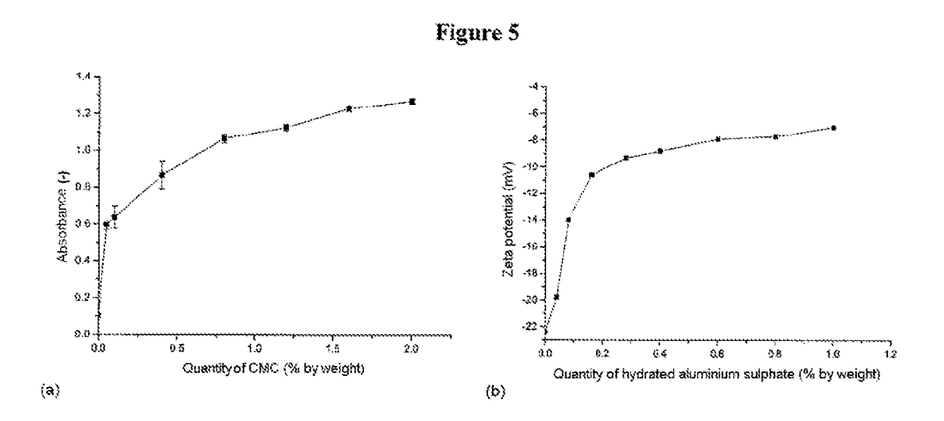
FIG. 5a is a graph of absorbance (in arbitrary units) as a function of the quantity of CMC in the suspension (% by weight) from example 3, in accordance with one embodiment.
FIG. 5b is a graph of the zeta potential (mV) as a function of the quantity of hydrated aluminium sulphate in the suspension (% by weight) from example 3, in accordance with one embodiment.

The absorbance of each of the suspensions based on CB and on CMC thus prepared was measured using a UV spectrometer (Unicam UV5 Series, Thermo Spectronic, Cambridge UK). The results are given in the attached FIG. 5*a* in which the absorbance (in arbitrary units) is a function of the quantity of CMC in the suspension (% by weight). This figure shows the dispersing effect of the CMC on the CB due to the absorption of the CMC on the CB.

Also, the electrical charge was determined and the zeta potential computed for the FBr fibres of each of the suspensions based on FBr treated by the hydrated aluminium sulphate, using a zeta-meter (SZP 04 Mutek). The results obtained are given in the attached FIG. 5*b* in which the zeta potential (mV) is a function of the quantity of hydrated aluminium sulphate in the suspension (% by weight). This figure shows the neutralization of the anionic charges on the FBr surface following the addition of hydrated aluminium sulphate.

These two effects coupled together make it possible to optimize the fixing of the CB on the cellulose fibres when mixing the suspensions of CB treated with the CMC and FBr treated with the hydrated aluminium sulphate.

Suspensions of CB-CMC and of FBr-hydrated aluminium sulphate were then mixed in respective quantities varying from 0 to 60% by weight of suspension of CB/CMC and 100 to 40% by weight of suspension of FBr/hydrated aluminium sulphate.

CB-CM/CBr-hydrated aluminium sulphate flexible composite papers were then prepared from each of the mixtures between CB-CMC and Fbr/hydrated aluminium sulphate by using the set up described above in the Example 2 and in FIG. 2, by using a nylon filtration cloth with a filtration threshold of 33 µm, followed by a pressing and a drying in a vacuum (10 minutes at 90° C.).

Each of the composite papers thus prepared was then evaluated from the point of view of its tensile strength and of its electrical conductivity as also described above in the Example 2.

Figure 6:
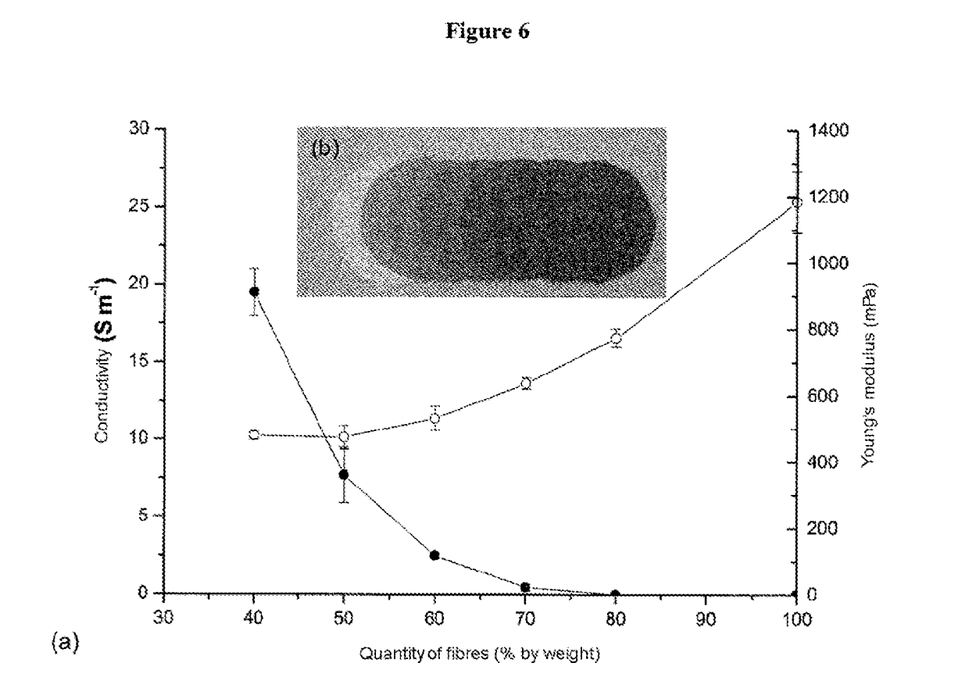
FIG. 6a is a graph of the conductivity ($Sm^{-1}$) and the Young's modulus (MPa) as a function of the FBr fibre content (% by weight) from example 3, in accordance with one embodiment.

The attached FIG. 6 gives the results obtained and gives (FIG. 6a) the conductivity (Sm$^{-1}$) and the Young's modulus (MPa) as a function of the FBr fibre content (% by weight). In this figure, the curve with the solid circles corresponds to the trend of the conductivity whereas the curve with the empty circles corresponds to the trend of the Young's modulus. A photograph of each of the composite papers is given by FIG. 6b.

FIG. 6 shows that the improvements of the fixing of the CB on the cellulose fibres during the mixing of the suspensions of CB treated with CMC and of the FBrs treated with hydrated aluminium sulphate has a direct effect on the conductivity of the composite papers obtained by filtration of the CB-CMC/FBr-hydrated aluminium sulphate mixtures. The composite papers obtained with Fbr and CB not previously treated with hydrated aluminium sulphate and CMC give almost zero conductivities.

The flexible cathodes were then prepared from a mixture of CB/CMC/FBr/hydrated aluminium sulphate (CB 60%, FBr 40%) to which was added a suspension of active electrode material (2% by weight suspension of LiFePO$_4$ in the water) in a proportion of 40% by weight of CB-CMC/FBr-hydrated aluminium sulphate mixtures for 60% by weight of suspension of active electrode material by using the set up described above in the Example 2 and in FIG. 2, using a nylon filtration cloth with a filtration threshold of 33 µm, followed by a pressing and a drying in vacuum (10 minutes at 90° C.).

The cathodes obtained show mechanical properties (mechanical strength, flexibility, etc.) similar to those of the anodes prepared in the Example 2.

Electrochemical tests were carried out on a half-battery using a lithium sheet as back-electrode and a solution of lithium hexafluorophosphate (1 mol/l) in EC:DEC (1:1) as electrolyte. The results of these electrochemical tests are given in the attached FIG. 7 in which the specific capacity (in mAhg$^{-1}$) is a function of the number of cycles. In this figure, the curves wish the empty circles correspond to the measurements performed during discharging and the solid circles to the measurements performed during charging, the calculation being made relative to the weight of the active electrode material.

Figure 7:
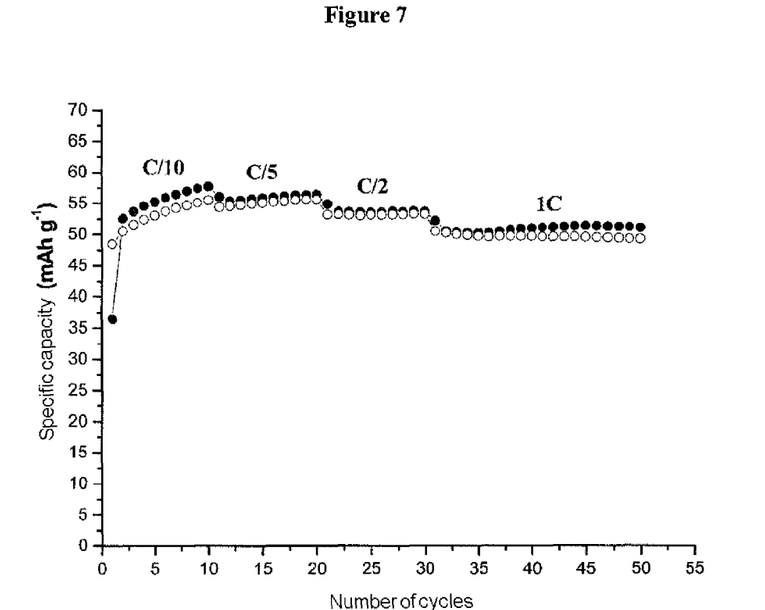
FIG. 7 is a graph of specific capacity (in $mAhg^{-1}$) as a function of the number of cycles from example 3, in accordance with one embodiment.

These results show that the cathodes prepared according to the procedure mentioned above have: a specific capacity of approximately 55 mAh/g (relative to the weight of active material LiFePO$_4$), this specific capacity being little affected by the charging/discharging current. For its part, the cycling resistance is at least 150 cycles at C/2.

Example 4

Preparation of a Complete Battery and Characterization

The electrodes prepared according to the procedures illustrated in the Examples 2 and 3 were used to produce a complete battery. The anode and the cathode were prepared in order to obtain a final composition of the electrodes in the dry state as follows:
anode FBr/GP/CMC: 10% by weight of FBr, 90% by weight of GP, and 1% by weight of CMC, relative to the weight of the dried fibres; FBr/hydrated aluminium sulphate/CB/CMC/LiFePO$_4$ cathode; 40% of the CB/CMC/FBr/hydrated aluminium sulphate mixture (mixture consisting of 60% by weight CB and 40% by weight FBr) and 60% by weight of LiFePO$_4$;

A sheet of paper dipped in a lithium hexafluorophosphate solution (1 mol/l) in EC:DEC (1:1) was used as separator between the two electrodes.

The battery was produced by stacking the three anode/separator/cathode components in a rigid measurement cell. The adhesion between the anode, the separator and the cathode was assured by the pressure exerted by the metal current collectors forming the measurement cell.

Figure 8:
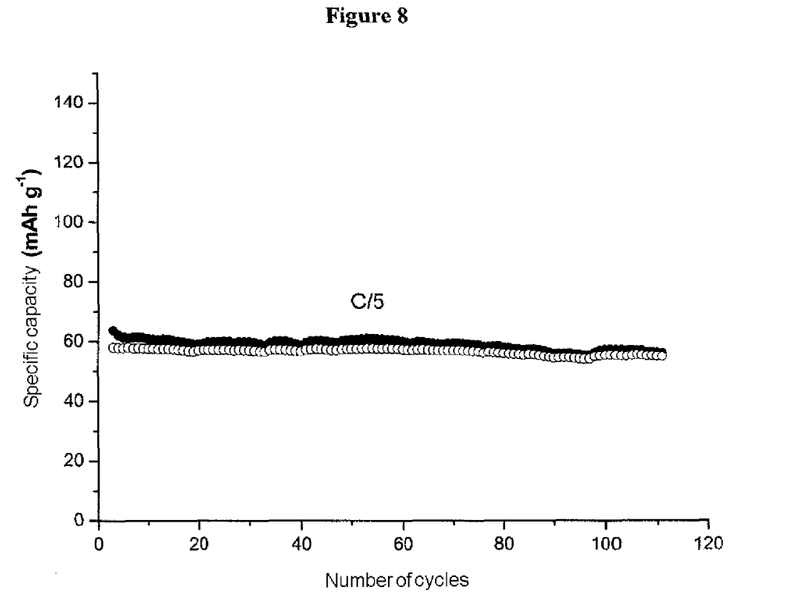
FIG. 8 is a graph of the specific capacity of the battery obtained by using an anode and a cathode prepared according to the procedures described in the Examples 2 and 3 (as per example 4), in accordance with one embodiment.

The results are given in the attached FIG. 8 in which the specific capacity (in mAhg$^{-1}$) is a function of the number of cycles. In this figure, the curves with the empty circles correspond to the measurements performed during charging and the solid circles to the measurements performed during discharging.

FIG. 8 shows that the specific capacity of the battery obtained by using an anode and a cathode prepared according to the procedures described in the Examples 2 and 3 and a sheet of paper as separator is 60 mAh/g (calculated relative to the weight of active cathodic substance, notable LiFePO$_4$) with a charging/discharging current of C/5. This value is comparable to the specific capacity obtained with half-battery tests, where the model battery consists of the cathode, a rock wool separator and a metal lithium sheet. This proves that the assembly of a battery by using the electrodes developed in the present invention, a paper separator and a liquid electrolyte makes it possible to achieve electrochemical performance levels comparable to those using model half-batteries using metallic lithium as back-electrode.

The invention claimed is:

1. Method for preparing a self-supporting flexible electrode g having at least one active electrode material, and at least one binder, said method comprising at least the following steps:
   i) a step of preparation of an aqueous paste by the dispersion of a mixture of solid particles in an aqueous phase, said mixture of solid particles having:
      at least one active electrode material, in a quantity varying from 50 to 98% by weight relative to the total weight of the mixture of solid particles,
      at least one binder comprising refined cellulose fibres, in a quantity varying from 2 to 50% by weight relative to the total weight of the mixture of solid particles;
   said mixture of solid particles representing at least 0.02% by weight of the total weight of the aqueous paste;
   ii) a step of filtration of the aqueous paste obtained above in the step i) on a filtration cloth;
   iii) optionally, a step of pressing, in the wet state, of the aqueous paste followed by its transfer onto a drying felt;
   iv) a drying step to obtain a sheet of dry flexible electrode supported by the filtration cloth or by the drying felt when the step iii) has been carried out; and
   v) a step of separation between the sheet of electrode and the filtration cloth or the drying felt when the step iii) has been carried out, to obtain the self-supporting flexible electrode.

2. Method according to claim 1, wherein the refined cellulose fibres (FBr) are obtained by a refining method comprising the following steps:
   a) a step of dispersion, in an aqueous medium, of previously dried cellulose fibres, to obtain a cellulose fibre paste in which the cellulose fibre content varies from 1 to 15% by weight relative to the total weight of said cellulose fibre paste; and b) a step of shearing of said cellulose fibre paste, so as to obtain refined cellulose fibres, that is to say cellulose fibres exhibiting a Schopper-Riegler degree varying from 30 to 95° SR.

3. Method according to claim 1, wherein an anti-flocculation agent for the fibres is incorporated in the aqueous suspension of the step i).

4. Method according to claim 3, wherein the anti-flocculation agent is chosen from carboxymethylcellulose (CMC), starch and one of their mixtures.

5. Method according to claim 3, wherein the anti-flocculation agent for the fibres represents 0.01 to 10% by weight relative to the total weight of the aqueous paste of the step i).

6. Method according to claim 1, wherein the concentration by weight of the mixture of solid particles in the aqueous suspension on completion of the step i) varies from 0.02 to 5%.

7. Method according to claim 1, wherein the filtration threshold of the step ii) is of the order of 1 to 100 µm.

8. Method according to claim 1, wherein the degree of refining of the refined cellulose fibres (FBr) is at least 30° SR.

9. Method according to claim 1, wherein the aqueous suspension of the step i) also contains at least one agent generating an electronic conductivity.

10. Method according to claim 9, wherein the agent generating an electronic conductivity is selected from the group consisting of carbon black, carbon SP, acetylene black, carbon fibres and nanofibres, carbon nanotubes, metal particles, and one of their mixtures.

11. Self-supporting flexible electrode obtained by the implementation of the method as defined in claim 1, wherein said self-supporting flexible electrode comprises at least one active electrode material, possibly at least one agent generating an electrical conductivity, possibly an anti-flocculation agent for the fibres and at least one binder comprising refined cellulose fibres (FBr) imprisoning said active electrode material.

12. Electrode according to claim 11, wherein said electrode is a positive electrode and that the active material is selected from the group consisting of $Li_xMn_yO_4$ ($0<x<2$, $0<y<2$ and $x+y=3$), $LiCoO_2$, $LiMPO_4$, (M=Fe, Mn, Co, Ni), $LiAl_xCo_yNi_zO_2$ ($0<x<1$, $0<y<1$, $0<z<1$ and $x+y+z=1$) and $LiNi_{(1-y)}Co_yO_2$ ($0 \leq y \leq 1$).

13. Electrode according to claim 11, wherein said electrode is a negative electrode and in that the active material is selected from the group consisting of: graphite, hard carbon, soft carbon and the metal alloys $Li_yM$ ($1<y<5$ and M=Mn, Sn, Pb, Si, In, Ti).

14. Electrode according to claim 11, wherein said electrode has a thickness varying from 50 to 300 µm.

15. Flexible lithium-ion battery comprising at least one negative electrode and/or at least one positive electrode between which is placed a solid electrolyte or a separator impregnated with a liquid electrolyte, wherein the positive electrode and/or the negative electrode is an electrode as defined in claim 11.

16. Battery according to claim 15, wherein each of the electrodes is a self-supporting flexible electrode as defined in claim 11, said electrodes being separated from one another by a sheet of paper impregnated with liquid electrolyte.

* * * * *